United States Patent
Takahashi (10) Patent No.: US 10,411,635 B2
(45) Date of Patent: Sep. 10, 2019

(54) ROTATING ELECTRIC MACHINE

(71) Applicant: DENSO CORPORATION, Kariya, Aichi-pref. (JP)

(72) Inventor: Yuki Takahashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/341,381

(22) Filed: Nov. 2, 2016

(65) Prior Publication Data

US 2017/0133968 A1    May 11, 2017

(30) Foreign Application Priority Data

Nov. 6, 2015    (JP) .................................. 2015-218934

(51) Int. Cl.
*H02K 37/00* (2006.01)
*H02P 25/18* (2006.01)
*H02P 25/22* (2006.01)

(52) U.S. Cl.
CPC ............ *H02P 25/184* (2013.01); *H02P 25/22* (2013.01)

(58) Field of Classification Search
CPC .......... H02K 1/16; H02K 16/00; H02K 16/04; H02K 17/26; H02K 19/06; H02K 19/08; H02K 19/10; H02K 19/103; H02K 23/36
USPC ..................................................... 310/49.33
See application file for complete search history.

(56) References Cited

U.S. PATENT DOCUMENTS

| 5,760,567 | A   |   | 6/1998 | Nakamura et al. |
| 7,034,426 | B2  | * | 4/2006 | Goche .................... H02K 17/08 310/184 |
| 8,796,899 | B2  | * | 8/2014 | Imazawa .................. H02K 3/50 310/198 |

(Continued)

FOREIGN PATENT DOCUMENTS

| JP | S64-34198 A   | 2/1989 |
| JP | 2008-219956 A | 9/2008 |

(Continued)

OTHER PUBLICATIONS

U.S. Appl. No. 15/341,529, filed Nov. 2, 2016 in the name of Yuki Takahashi.

(Continued)

*Primary Examiner* — Bickey Dhakal
(74) *Attorney, Agent, or Firm* — Oliff PLC (57) ABSTRACT

A rotating electric machine includes a rotor and a stator. The stator includes a stator core and a stator coil. The stator coil includes three first windings, three second windings and three switch units. The first windings are Δ-connected to define three nodes therebetween. The second windings are arranged so as to be respectively connectable between the nodes and three phase terminals of the stator coil. The switch units respectively switch the connections between the nodes and the phase terminals between a direct connection state and an indirect connection state. In the direct connection state, the nodes are respectively directly connected with the phase terminals. In the indirect connection state, the nodes are respectively connected with the phase terminals via the second windings. The first and second windings are mounted on the stator core so that the first windings are located closer than the second windings to the rotor.

6 Claims, 10 Drawing Sheets

(56) References Cited

U.S. PATENT DOCUMENTS

| | | | |
|---|---|---|---|
| 2002/0074969 A1* | 6/2002 | Edelson | H02P 27/02 318/801 |
| 2004/0195994 A1 | 10/2004 | Kume et al. | |
| 2004/0227482 A1 | 11/2004 | Yoshida et al. | |
| 2005/0253540 A1 | 11/2005 | Kobayashi et al. | |
| 2008/0036416 A1 | 2/2008 | Lo | |
| 2009/0072652 A1* | 3/2009 | Koike | H02K 3/28 310/198 |
| 2009/0237021 A1 | 9/2009 | Yamamoto et al. | |
| 2009/0267440 A1* | 10/2009 | Kometani | H02K 1/16 310/198 |
| 2009/0302792 A1 | 12/2009 | Osada et al. | |
| 2010/0054972 A1 | 3/2010 | Li et al. | |
| 2014/0125185 A1* | 5/2014 | Suzuki | H02K 3/28 310/198 |
| 2014/0239876 A1* | 8/2014 | Hao | H02P 25/188 318/724 |
| 2016/0072416 A1* | 3/2016 | Hirotani | H02P 25/22 318/400.02 |

FOREIGN PATENT DOCUMENTS

| | | |
|---|---|---|
| JP | 2011-103769 A | 5/2011 |
| JP | 2014-054094 A | 3/2014 |
| JP | 2014-075937 A | 4/2014 |
| WO | 2008/044703 A1 | 4/2008 |

OTHER PUBLICATIONS

U.S. Appl. No. 15/341,363, filed Nov. 2, 2016 in the name of Yuki Takahashi.
Nov. 8, 2017 Office Action issued in U.S. Appl. No. 15/341,529.
Nov. 30, 2017 Office Action issued in U.S. Appl. No. 15/341,363.
Jun. 19, 2018 Office Action issued in U.S. Appl. No. 15/341,363.

* cited by examiner

ROTATING ELECTRIC MACHINE

CROSS-REFERENCE TO RELATED APPLICATION

This application is based on and claims priority from Japanese Patent Application No. 2015-218934 filed on Nov. 6, 2015, the content of which is hereby incorporated by reference in its entirety into this application.

BACKGROUND

1 Technical Field

The present invention relates to rotating electric machines that are used in, for example, motor vehicles as electric motors and electric generators.

2 Description of Related Art

Conventionally, it has been desired for electric motors for electric vehicles to exert high-torque and high-efficiency characteristics over a wide operating range from low speed to high speed.

To satisfy such a desire, there has been developed a method of switching the connection of a stator coil of an electric motor between a Y connection (or star connection) and a Δ connection (or delta connection) so as to enable the electric motor to exert optimal characteristics in both a low-speed region and a high-speed region (see, for example, Japanese Patent Application Publications No. JPS6434198A and No. JP2014054094A and Japanese Patent No. JP3948009B2).

Specifically, according to the method, in the low-speed region, the Y connection is selected to apply a sufficiently high voltage to the stator coil, so that a high torque can be obtained with the same electric current. On the other hand, in the high-speed region where the frequency of the electric current is high, it becomes difficult for the electric current to flow since the impedance of the electric motor increases in proportion to the frequency of the electric current. Therefore, in the high-speed region, the Δ connection which has a low impedance is selected to facilitate the flow of the electric current.

Accordingly, it is important to increase the maximum output torque of the electric motor when the Y connection is selected and to secure high characteristics of the electric motor in the high-speed and low-torque region when the Δ connection is selected.

Moreover, in the Y connection, every two of the three phase windings of the stator coil are connected in series with each other. On the other hand, in the Δ connection, every two of the three phase windings of the stator coil are connected in parallel with each other. Therefore, the copper loss of the stator coil is higher when the Y connection is selected than when the Δ connection is selected. Accordingly, it is important to suppress the copper loss of the stator coil (i.e., heat produced by the stator coil during operation) when the Y connection is selected.

SUMMARY

According to exemplary embodiments, there is provided a rotating electric machine which includes a rotor and a stator. The stator includes a hollow cylindrical stator core and a multi-phase stator coil. The stator core is disposed in radial opposition to the rotor and has a plurality of slots arranged in a circumferential direction thereof. The stator coil is mounted on the stator core so as to be received in the slots of the stator core. The stator coil includes three first windings, three second windings and three switch units. The first windings are Δ-connected to define three nodes therebetween. The second windings are arranged so as to be respectively connectable between the nodes and three phase terminals of the stator coil. The switch units respectively switch the connections between the nodes and the phase terminals between a direct connection state and an indirect connection state. In the direct connection state, the nodes are respectively directly connected with the phase terminals. In the indirect connection state, the nodes are respectively connected with the phase terminals via the second windings. The first and second windings are mounted on the stator core so that the first windings are located closer than the second windings to the rotor.

With the above configuration, when the connections between the nodes and the phase terminals are respectively switched by the switch units to the direct connection state, the stator coil forms a Δ connection for high-speed output of the rotating electric machine. On the other hand, when the connections between the nodes and the phase terminals are respectively switched by the switch units to the indirect connection state, the stator coil forms a Y-Δ connection (or star-delta connection) for low-speed output of the rotating electric machine. That is, the stator coil is switched by the switch units between the Δ connection for high-speed output of the rotating electric machine and the Y-Δ connection for low-speed output of the rotating electric machine.

Moreover, when the stator coil is energized in the Y-Δ connection, the electric current flowing in the Δ-connected first windings is lower than the electric current flowing in the second windings. Therefore, the copper loss of (or heat produced by) the first windings is also lower than the copper loss of the second windings. More specifically, the copper loss is in proportion to the square of the electric current; therefore, the copper loss of the first windings is about ⅓ of the copper loss of the second windings.

In consideration of the above, in the rotating electric machine, the first and second windings are mounted on the stator core so that the first windings are located closer than the second windings to the rotor. Hence, the second windings which produce more heat than the first windings can be located closer than the first windings to a back core portion of the stator core; the back core portion has a high heat capacity. Consequently, heat produced by the stator coil can be effectively dissipated and thus the stator coil can be easily cooled. As a result, it is possible to improve the thermal characteristics of the stator coil.

Moreover, when the rotor is configured as an Interior Permanent Magnet (IPM) rotor, since the first windings which produce less heat are located closer to the rotor, it is possible suppress the influence of heat produced by the stator coil on permanent magnets of the rotor, thereby suppressing demagnetization of the permanent magnets due to heat.

Furthermore, the total torque of the rotating electric machine includes magnet torque (or magnetic torque) that is the product of d-axis magnet magnetic flux Ψ and q-axis electric current, and reluctance torque that is the product of d-axis and q-axis electric currents and the difference between q-axis inductance and d-axis inductance. In a low-torque region, both field-weakening current and field-weakening magnetic flux are not available since the electric current is low. Therefore, in the total torque of the rotating electric machine, the percentage of the magnet torque that uses the q-axis electric current is apt to be higher than the percentage of the reluctance torque that uses the d-axis and q-axis electric currents. Here, by arranging the Δ-connected first windings in the stator core so as to be located on the rotor side where the radial distance from the permanent magnets of the rotor is short and the magnetic reluctance is low, it is possible to output a large amount of the magnet magnetic flux Ψ, thereby achieving a high efficiency of the rotating electric machine in the low-torque region. On the other hand, by arranging the second windings in the stator core so as to be located on the non-rotor side, it is possible to maintain the inductances constituting the reluctance torque that is effective in low-speed and high-torque operation of the rotating electric machine during which high d-axis and q-axis electric currents are supplied; it is also possible to suppress the magnet magnetic flux Ψ, which may become an excessive voltage source during the high-electric current adaption, from being increased more than necessary.

BRIEF DESCRIPTION OF THE DRAWINGS

The present invention will be understood more fully from the detailed description given hereinafter and from the accompanying drawings of exemplary embodiments, which, however, should not be taken to limit the invention to the specific embodiments but are for the purpose of explanation and understanding only.

In the accompanying drawings.

DESCRIPTION OF EMBODIMENTS

Exemplary embodiments will be described hereinafter with reference to FIGS. 1-14. It should be noted that for the sake of clarity and understanding, identical components having identical functions throughout the whole description have been marked, where possible, with the same reference numerals in each of the figures and that for the sake of avoiding redundancy, descriptions of identical components will not be repeated.

First Embodiment

Figure 1:
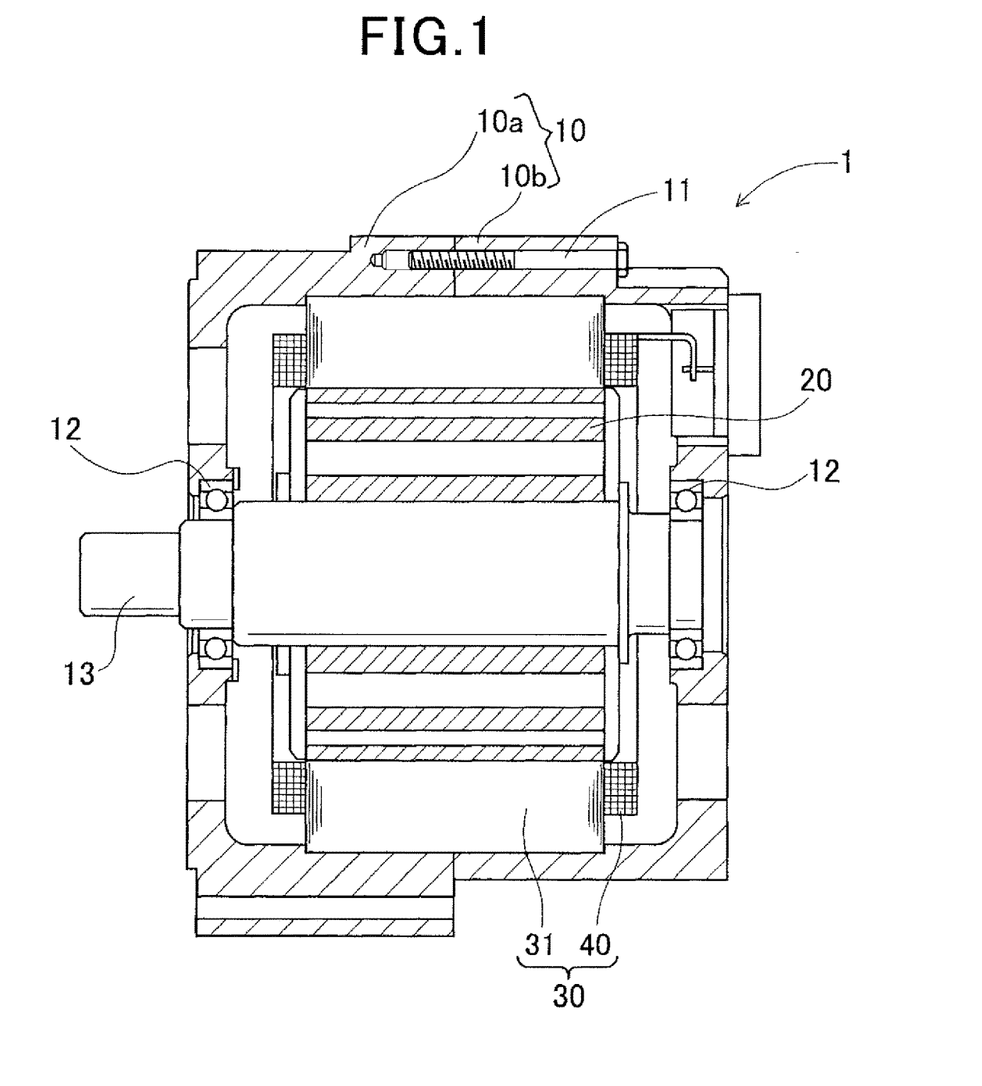
FIG. 1 is a schematic cross-sectional view, along an axial direction, of a rotating electric machine according to a first embodiment.

FIG. 1 shows the overall configuration of a rotating electric machine 1 according to a first embodiment.

In the present embodiment, the rotating electric machine 1 is configured as an electric motor for use in a motor vehicle.

As shown in FIG. 1, the rotating electric machine 1 includes a housing 10, a rotating shaft 13, a rotor 20 and a stator 30.

The housing 10 has a hollow cylindrical shape with both axial ends closed. The housing 10 is comprised of a pair of cup-shaped housing pieces 10a and 10b which are fixed together at the open ends thereof by, for example, a plurality of bolts 11.

The rotating shaft 13 is rotatably supported by the housing 10 via a pair of bearings 12 that are provided respectively in opposite axial end walls of the housing 10.

The rotor 20 is received in the housing 10 and fixedly fitted on an axially central part of the rotating shaft 13 so as to rotate together with the rotating shaft 13. The rotor 20 functions as a field.

Figure 5:
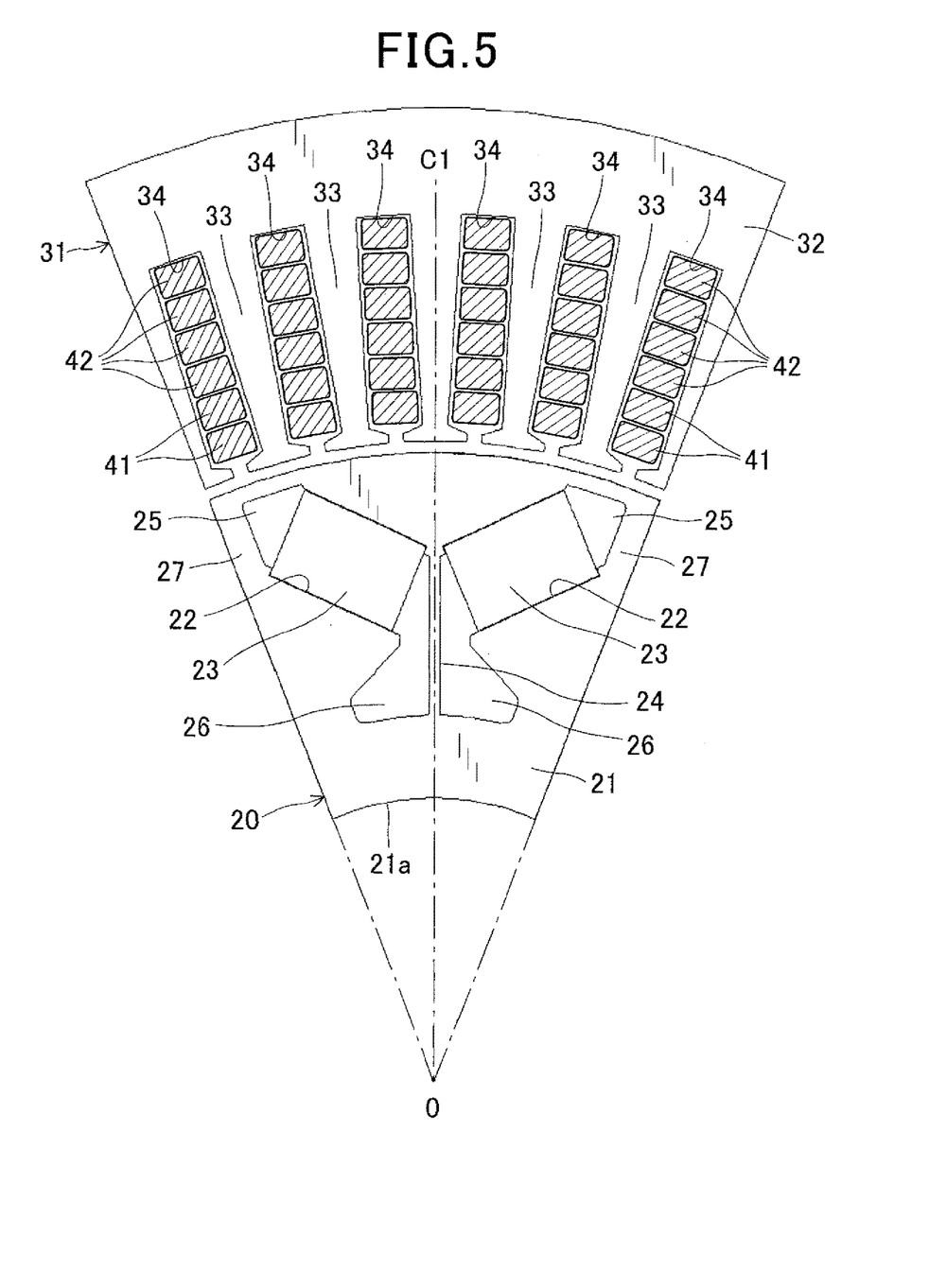
FIG. 5 is a schematic view, along the axial direction, of part of the rotating electric machine.

Referring to FIG. 5, the rotor 20 includes a rotor core 21 and a plurality of permanent magnets 23 embedded in the rotor core 21. That is to say, in the present embodiment, the rotor 20 is configured as an Interior Permanent Magnet (IPM) rotor.

The rotor core 21 is formed, by axially laminating a plurality of annular magnetic steel sheets, into a hollow cylindrical shape. Consequently, at the radial center of the rotor core 21, there is formed a through-hole 21a, in which the rotating shaft 13 is fixedly fitted so as to rotate together with the rotor core 21.

The permanent magnets 23 are embedded in the rotor core 21 so as to form a plurality of magnetic poles of the rotor 20 on the radially outer periphery of the rotor core 21. The magnetic poles are equally spaced in the circumferential direction of the rotor core 21 at predetermined intervals so that the polarities of the magnetic poles alternate between N (North) and S (South) in the circumferential direction. In addition, in the present embodiment, the number of the magnetic poles of the rotor 20 is equal to, for example, 8 (i.e., 4 N poles and 4 S poles).

More specifically, in the present embodiment, the rotor core 21 has a plurality (e.g., eight) of pairs of magnet-receiving holes 22 formed in the vicinity of the radially outer periphery of the rotor core 21. Each of the magnet-receiving holes 22 extends in the axial direction of the rotor core 21 so as to penetrate the rotor core 21 in the axial direction. Further, each of the magnet-receiving holes 22 has a substantially rectangular cross section perpendicular to a longitudinal axis (or rotation axis) O of the rotor core 21.

In addition, it should be noted that though there is shown only one pair of the magnet-receiving holes 22 in FIG. 5, the plurality of pairs of the magnet-receiving holes 22 are equally spaced in the circumferential direction of the rotor core 21 at predetermined intervals.

Moreover, in the present embodiment, each pair of the magnet-receiving holes 22 is arranged so as to form a substantially V-shape that opens toward the radially outer periphery of the rotor core 21. Further, for each pair of the magnet-receiving holes 22, there is formed a corresponding center bridge 24 of the rotor core 21 which extends in a radial direction of the rotor core 21 at a substantially constant width so as to separate the two magnet-receiving holes 22 of the pair from each other. The corresponding center bridge 24 is provided for causing magnetic flux saturation and thereby impeding formation of a magnetic circuit between the two magnet-receiving holes 22.

Each of the permanent magnets 23 is inserted in a corresponding one of the magnet-receiving holes 22 of the rotor core 21 so as to extend in the axial direction of the rotor core 21. Further, each of the permanent magnets 23 has a substantially rectangular cross section perpendicular to the axial direction of the rotor core 21 (i.e., the direction of the longitudinal axis O of the rotor core 21). That is to say, in the present embodiment, each of the permanent magnets 23 has a substantially cuboid shape.

Moreover, for each pair of the magnet-receiving holes 22 of the rotor core 21, the two permanent magnets 23 which are respectively inserted in the two magnet-receiving holes 22 of the pair are arranged so that the polarities (N or S) of the two permanent magnets 23 are the same on the radially outer periphery of the rotor core 21. Consequently, the two permanent magnets 23 together form one of the magnetic poles of the rotor 20 on the radially outer periphery of the rotor core 21. In addition, as shown in FIG. 5, when viewed along the axial direction of the rotor core 21, the two permanent magnets 23 are symmetrically arranged and extend obliquely with respect to a centerline C1 of the magnetic pole; the centerline C1 extends in the radial direction, along which the corresponding center bridge 24 of the rotor core 21 is formed, and bisects the magnetic pole in the circumferential direction of the rotor core 21. Consequently, the two permanent magnets 23 also together form a substantially V-shape that opens radially outward (i.e., toward the radially outer periphery of the rotor core 21).

The rotor core 21 also has a plurality of q-axis core portions 27 through which q-axis magnetic flux flows. Each of the q-axis core portions 27 is formed between a corresponding one circumferentially-adjacent pair of the magnetic poles of the rotor 20. Further, for each of the magnet-receiving holes 22 of the rotor core 21, there is provided a first magnetic flux barrier (or magnetic void) 25 between the corresponding permanent magnet 23 received in the magnet-receiving hole 22 and the corresponding q-axis core portion 27 adjacent to the magnet-receiving hole 22. In other words, the first magnetic flux barrier 25 is provided on the corresponding q-axis core portion 27 side of the magnet-receiving hole 22.

Moreover, for each pair of the magnet-receiving holes 22 of the rotor core 21, there are provided a pair of second magnetic flux barriers 26 that respectively extend from centerline C1-side ends of the pair of the magnet-receiving holes 22 toward the longitudinal axis O of the rotor core 21. Further, the corresponding center bridge 24, which is formed between the pair of the magnet-receiving holes 22, is radially extended toward the longitudinal axis O of the rotor core 21 so as to also separate the pair of the second magnetic flux barriers 26 from each other.

In addition, in the present embodiment, each of the first and second magnetic flux barriers 25 and 26 is provided in the form of an air hole in the rotor core 21.

Referring back to FIGS. 1 and 2, the stator 30 includes a hollow cylindrical (or annular) stator core 31 and a three-phase stator coil 40 mounted on the stator core 31.

The stator core 31 is disposed radially outside the rotor 20 so that the radially inner surface of the stator core 31 faces the radially outer surface of the rotor core 21 through a predetermined air gap formed therebetween. The stator core 31 is fixed to the inner circumferential surface of the housing 10. More specifically, the stator core 31 is axially fixedly sandwiched between the pair of housing pieces 10a and 10b (see FIG. 1).

In the present embodiment, the stator core 31 is formed by axially laminating a plurality of magnetic steel sheets into the hollow cylindrical shape.

Figure 3:
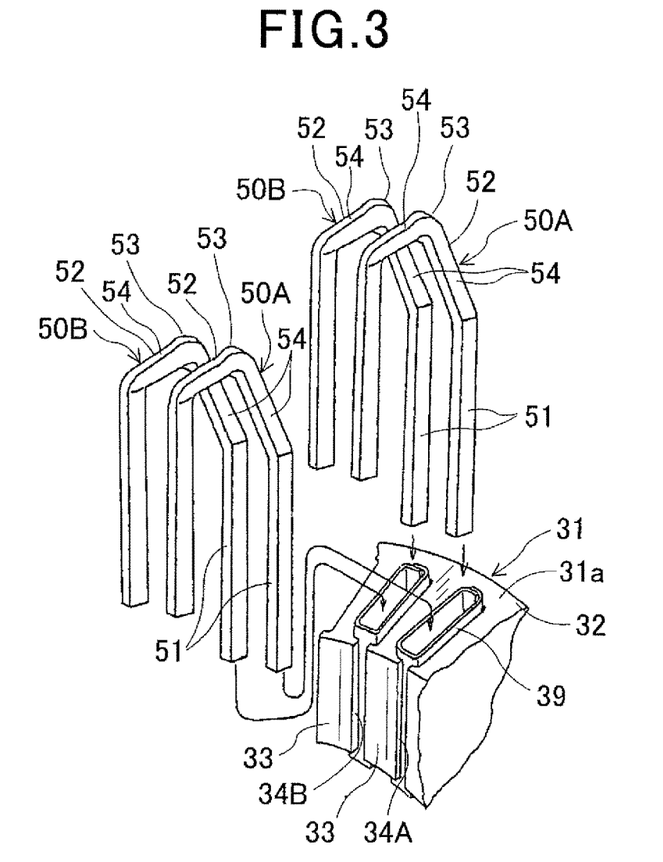
FIG. 3 is a schematic view illustrating the manner of inserting electric wire segments forming a stator coil into slots of a stator core of the stator.

Referring now to FIG. 3, the stator core 31 includes an annular back core portion 32, a plurality of teeth 33 and a plurality of slots 34. The teeth 33 each extend radially inward from the back core portion 32 and are spaced from one another at a predetermined pitch in the circumferential direction of the stator core 31 (or the circumferential direction of the back core portion 32). Each of the slots 34 is formed between one circumferentially-facing pair of side surfaces of the teeth 33 so as to radially extend to open on the radially inner surface of the stator core 31.

In the present embodiment, the number of the slots 34 formed per magnetic pole of the rotor 20 that has the eight magnetic poles and per phase of the three-phase stator coil 40, namely, the slot multiplier number is equal to 2. Accordingly, the total number Sn of the slots 34 formed in the stator core 31 can be determined by the following equation: Sn=S×Mn×P=2×8×3=48, where S is the slot multiplier number, Mn is the number of the magnetic poles of the rotor 20 and P is the number of phases of the stator coil 40.

In the present embodiment, the stator coil 40 is formed by first mounting a plurality of substantially U-shaped electric wire segments 50 to the stator core 31 and then joining each corresponding pair of ends of the electric wire segments 50.

Figure 4:
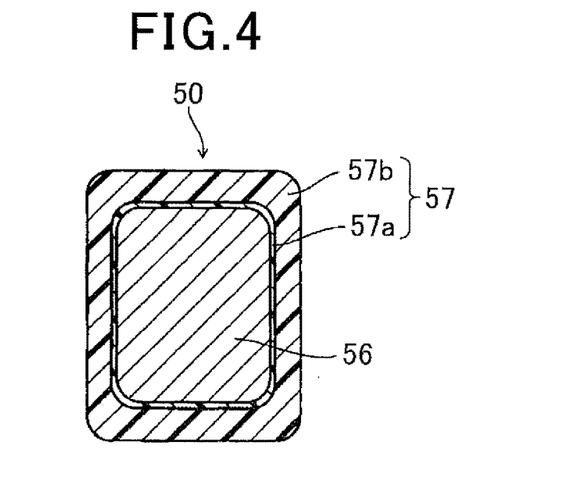
FIG. 4 is a cross-sectional view illustrating the configuration of the electric wire segments forming the stator coil.

Referring to FIG. 4, each of the electric wire segments 50 is obtained by cutting and bending an electric wire that includes an electric conductor 56 and an insulating coat 57 that covers the outer surface of the electric conductor 56. The electric conductor 56 is made of electrically conductive material, such as copper or aluminum, and has a substantially rectangular cross section. The insulating coat 57 is two-layer structured to include an inner coat 57a and an outer coat 57b that is formed outside the inner coat 57a. The inner coat 57a may be made, for example, of a polyimide (PI) or polyamide-imide (PAI) resin. On the other hand, the outer coat 57b may be made, for example, of a polyetheretherketone (PEEK) resin.

Referring back to FIG. 3, each of the electric wire segments 50 is substantially U-shaped to have a pair of straight portions 51 extending parallel to each other and a turn portion 52 connecting ends of the straight portions 51 on the same side. The turn portion 52 has an apex part 53 formed at the center of the turn portion 52 so as to extend parallel to a corresponding one of axial end faces 31a of the stator core 31. The turn portion 52 also has a pair of oblique parts 54 formed respectively on opposite sides of the apex part 53 so as to extend obliquely at a predetermined angle with respect to the corresponding axial end face 31a of the stator core 31. In addition, the stator 30 further includes insulators 39 that are provided between the stator core 31 and the electric wire segments 50 so as to electrically insulate them from each other.

In the present embodiment, as shown in FIG. 3, the electric wire segments 50 forming the stator coil 40 include a plurality of pairs of first and second electric wire segments 50A and 50B. For each pair of the first and second electric wire segments 50A and 50B, the straight portions 51 of the first electric wire segment 50A are inserted, from one axial side (i.e., the upper side in FIG. 3) of the stator core 31, into different ones of the slots 34 of the stator core 31 from those of the second electric wire segment 50B. More specifically, the slots 34 in which the straight portions 51 of the first electric wire segment 50A are inserted are respectively adjacent to and belong to the same phase as those in which the straight portions 51 of the second electric wire segment 50B are inserted.

For example, for that pair of the first and second electric wire segments 50A and 50B which is shown on the right upper side in FIG. 3, the first electric wire segment 50A has its right-side straight portion 51 inserted in the sixth layer (i.e., the radially outermost layer) of one slot 34A and its left-side straight portion 51 inserted in the fifth layer of another slot (not shown) that is positioned counterclockwise of the slot 34A by one magnetic pole pitch (i.e., a pitch between the N and S poles of the rotor 20). On the other hand, the second electric wire segment 50B has its right-side straight portion 51 inserted in the sixth layer of one slot 34B that is positioned counterclockwise of and immediately adjacent to the slot 34A and its left-side straight portion 51 inserted in the fifth layer of another slot (not shown) that is positioned counterclockwise of the slot 34B by one magnetic pole pitch. That is, the first and second electric wire segments 50A and 50B are circumferentially offset from each other by one slot pitch.

In addition, in each of the slots 34 of the stator core 31, there are inserted an even number of the straight portions 51 of the electric wire segments 50. More specifically, in the present embodiment, in each of the slots 34 of the stator core 31, there are inserted six straight portions 51 of the electric wire segments 50 so as to be radially stacked in six layers in the slot 34 (see FIG. 5).

For each of the electric wire segments 50, free end parts of the straight portions 51 of the electric wire segment 50, which protrude outside of the corresponding slots 34 on the other axial side of the stator core 31, are twisted respectively toward opposite sides in the circumferential direction of the stator core 31 so as to extend obliquely at a predetermined angle with respect to the corresponding axial end face 30a of the stator core 31. Consequently, each of the free end parts of the straight portions 51 is transformed into an oblique part 55 that extends in the circumferential direction of the stator core 31 for substantially half a magnetic pole pitch (see FIG. 2).

Figure 2:
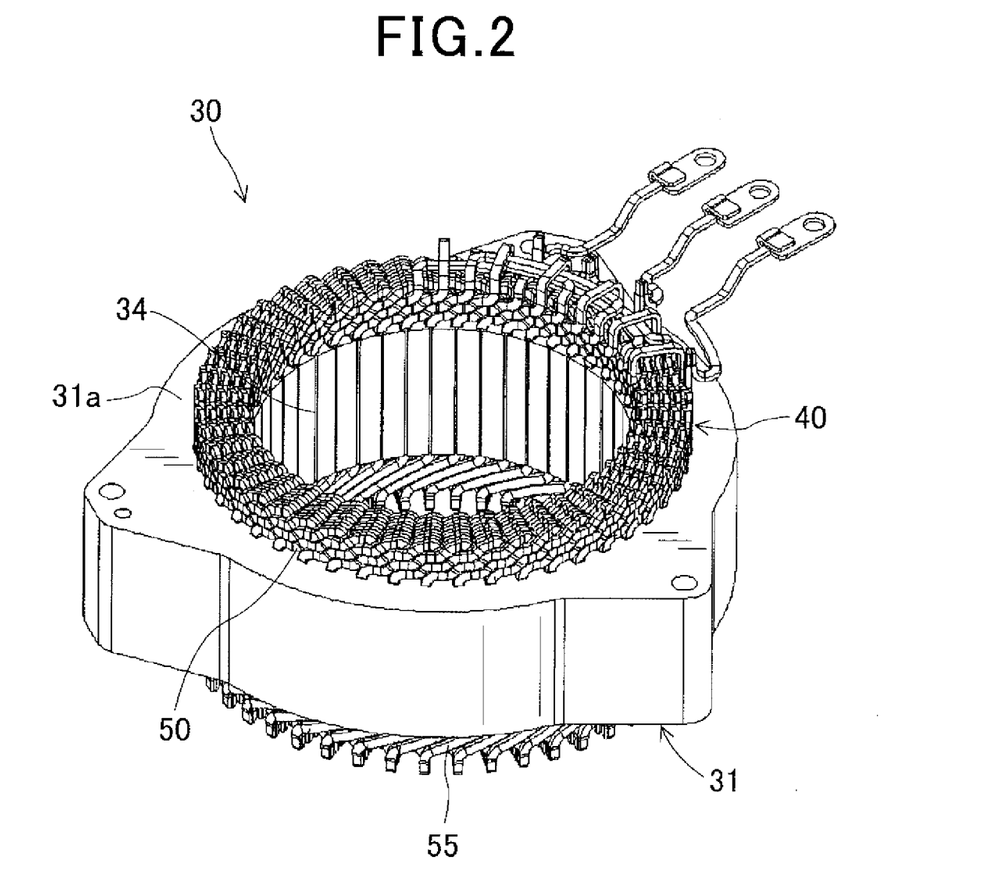
FIG. 2 is a perspective view of a stator of the rotating electric machine.

Further, on the other axial side of the stator core 31, each corresponding pair of the oblique parts 55 of the electric wire segments 50 are welded at their respective distal ends, thereby being electrically connected to each other. More specifically, for each phase winding of the three-phase stator coil 40, all the electric wire segments 50 which together constitute the phase winding are electrically connected in series with one another. As a result, each phase winding of the stator coil 40 is spirally wave-wound around the stator core 31 by, for example, 6 turns in the circumferential direction of the stator core 31.

In addition, each phase winding of the stator coil 40 further includes, in addition to the substantially U-shaped electric wire segments 50 as shown in FIG. 3, other electric wire segments of different shapes (not shown). These other electric wire segments include: electric wire segments each including a lead portion of the phase winding for electrical connection of the phase winding; and electric wire segments each including a connection portion of the phase winding for connecting two consecutive turns (e.g., the first and second turns) of the phase winding.

Figure 6:
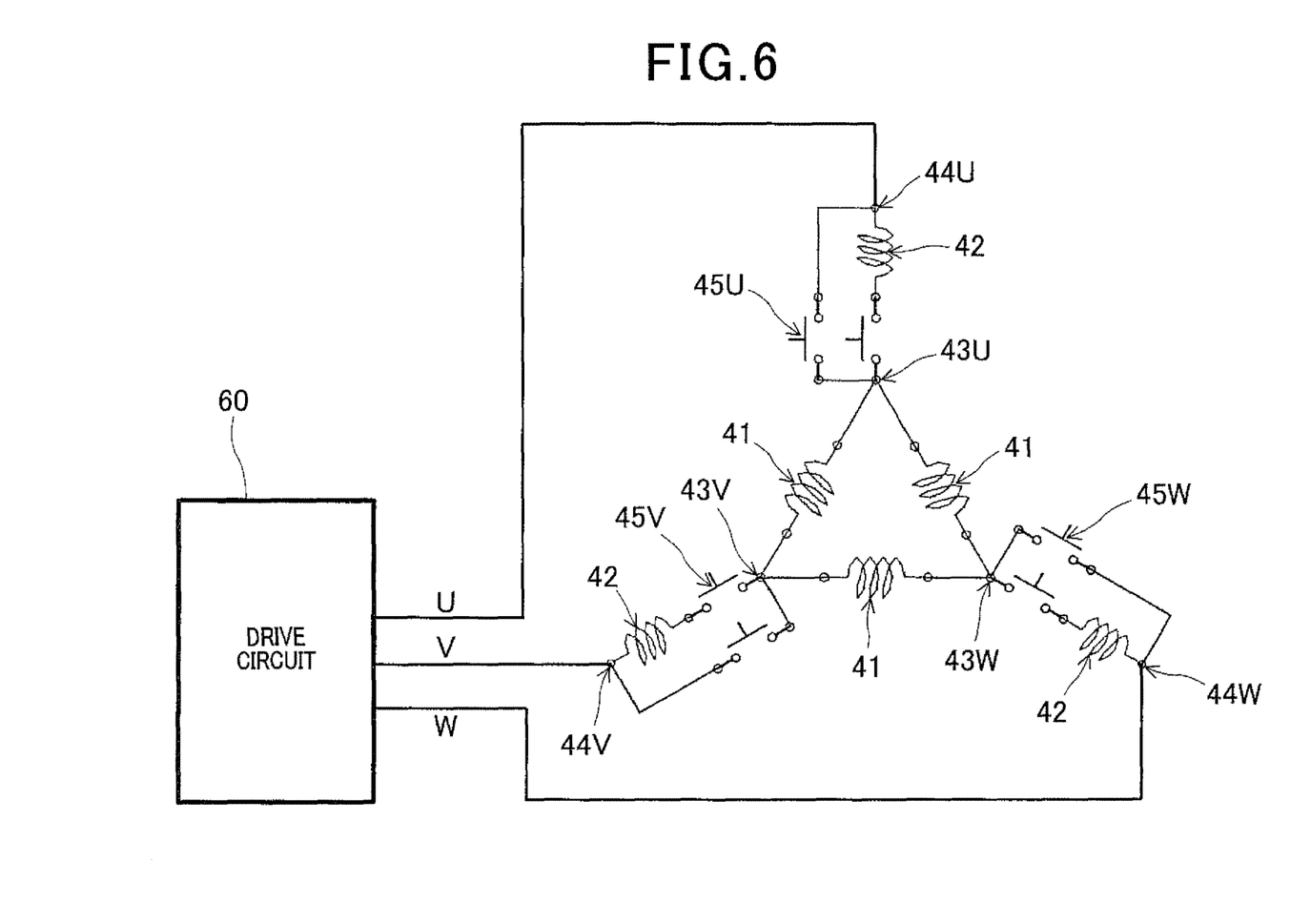
FIG. 6 is a schematic connection diagram of the stator coil.

As shown in FIG. 6, in the present embodiment, the stator coil 40 includes: three first windings 41 for high-speed output of the rotating electric machine 1 which are Δ-connected to define three nodes (or junction points) 43U, 43V and 43W therebetween; three second windings 42 for low-speed output of the rotating electric machine 1 which are arranged so as to be respectively connectable between the nodes 43U, 43V and 43W and three phase terminals 44U, 44V and 44W of the stator coil 40; and three switch units 45U, 45V and 45W that respectively switch the connections between the nodes 43U, 43V and 43W and the phase terminals 44U, 44V and 44W between a direct connection state and an indirect connection state. In the direct connection state, the nodes 43U, 43V and 43W are respectively directly connected with the phase terminals 44U, 44V and 44W. In the indirect connection state, the nodes 43U, 43V and 43W are respectively connected with the phase terminals 44U, 44V and 44W via the second windings 42.

Each of the switch units 45U, 45V and 45W includes a pair of switches that are on/off controlled by a controller (not shown). The pair of switches are configured so as to be operated in inverse relation to each other and thus not to be turned on at the same time.

When the connections between the nodes 43U, 43V and 43W and the phase terminals 44U, 44V and 44W are respectively switched by the switch units 45U, 45V and 45W to the direct connection state, the stator coil 40 forms a Δ connection for high-speed output of the rotating electric machine 1. On the other hand, when the connections between the nodes 43U, 43V and 43W and the phase terminals 44U, 44V and 44W are respectively switched by the switch units 45U, 45V and 45W to the indirect connection state, the stator coil 40 forms a Y-Δ connection (or star-delta connection) for low-speed output of the rotating electric machine 1. That is, the stator coil 40 is switched by the switch units 45U, 45V and 45W between the Δ connection for high-speed output of the rotating electric machine 1 and the Y-Δ connection for low-speed output of the rotating electric machine 1.

Moreover, when the stator coil 40 is energized in the Y-Δ connection, the electric current flowing in the Δ-connected first windings 41 is lower than the electric current flowing in the second windings 42. Therefore, the copper loss of (or heat produced by) the first windings 41 is also lower than the copper loss of the second windings 42. More specifically, the copper loss is in proportion to the square of the electric current; therefore, the copper loss of the first windings 41 is about ⅓ of the copper loss of the second windings 42.

In consideration of the above, in the present embodiment, the first and second windings 41 and 42 are mounted on the stator core 31 so that the first windings 41 are located closer than the second windings 42 to the rotor 20 (i.e., the first windings 41 are located radially inside the second windings 42).

More specifically, in the present embodiment, as shown in FIG. 5, in each of the slots 34 of the stator core 31, there are received six electric wire segments 50 forming the first and second windings 41 and 42 of the stator coil 40 so as to be radially aligned with each other. Among the six electric wire segments 50, those two electric wire segments 50 which are located closest to the rotor 20 (i.e., the radially innermost two electric wire segments 50) are included in the first windings 41, while the remaining four electric wire segments 50 are included in the second windings 42. That is, in each of the slots 34 of the stator core 31, there are received two electric wire segments 50 forming the first windings 41.

With the above arrangement, the second windings 42 which produce more heat than the first windings 41 are located closer than the first windings 41 to the back core portion 32 of the stator core 31; the back core portion 32 has a high heat capacity. Consequently, heat produced by the stator coil 40 can be effectively dissipated and thus the stator coil 40 can be easily cooled. As a result, it is possible to improve the thermal characteristics of the stator coil 40.

Referring again to FIG. 6, in the present embodiment, three-phase AC voltage is applied by a drive circuit 60 to the stator coil 40. More specifically, based on signals outputted from the controller (not shown) and a position sensor (not shown) that senses the rotational position of the rotor 20, the drive circuit 60 applies the three-phase AC voltage to the stator coil 40, thereby causing a desired rotating magnetic field to be created from the stator coil 40. In addition, the drive circuit 60 may be implemented by, for example, a well-known inverter that generates three-phase AC voltage.

Figure 7:
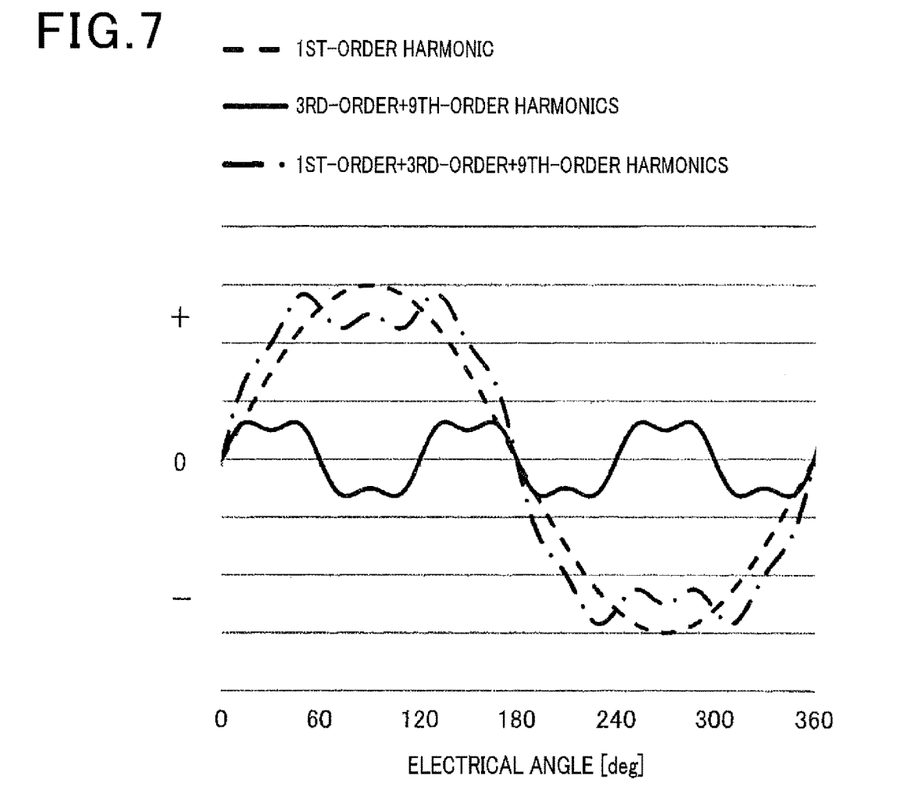
FIG. 7 is a waveform chart illustrating electric current supplied to the stator coil.

Moreover, in the present embodiment, to the Δ-connected first windings 41, there is supplied electric current having a waveform as shown with a one-dot chain line in FIG. 7. The waveform is obtained by superimposing a specific harmonic waveform as shown with a continuous line in FIG. 7 on a first-order harmonic waveform as shown with a dashed line in FIG. 7. The first-order harmonic waveform is a fundamental control waveform. The specific harmonic waveform is one of third-order and (3+6n)th-order harmonic waveforms or a harmonic waveform, which is obtained by synthesizing at least two of the third-order and (3+6n)th-order harmonic waveforms, where n is a natural number greater than or equal to 1. The specific harmonic waveform takes a positive integral value for a positive half cycle of the first-order harmonic waveform (e.g., the half cycle from 0° to 180° in FIG. 7) and a negative integral value for a negative half cycle of the first-order harmonic waveform (e.g., the half cycle from 180° to 360° in FIG. 7). In other words, the integral value of the specific harmonic waveform for a positive half cycle of the first-order harmonic waveform is positive; the integral value of the specific harmonic waveform for a negative half cycle of the first-order harmonic waveform is negative. More particularly, in the present embodiment, the specific harmonic waveform is a harmonic waveform which is obtained by synthesizing the third-order harmonic waveform and a ninth-order harmonic waveform (i.e., the (3+6n)th-order harmonic waveform with n being equal to 1).

In the present embodiment, by arranging the Δ-connected first windings 41 for high-speed output of the rotating electric machine 1 in the stator core 31 so as to be located on the rotor 20 side where the strength of magnet magnetic flux (or magnetic flux generated by magnets) Ψ is high, it becomes possible to output a large amount of the magnet magnetic flux Ψ, thereby achieving a high efficiency of the rotating electric machine 1 in a low-torque region.

Hereinafter, the principle of increasing the magnet magnetic flux Ψ using the third-order and (3+6n)th-order harmonics according to the present embodiment will be described.

Figure 8:
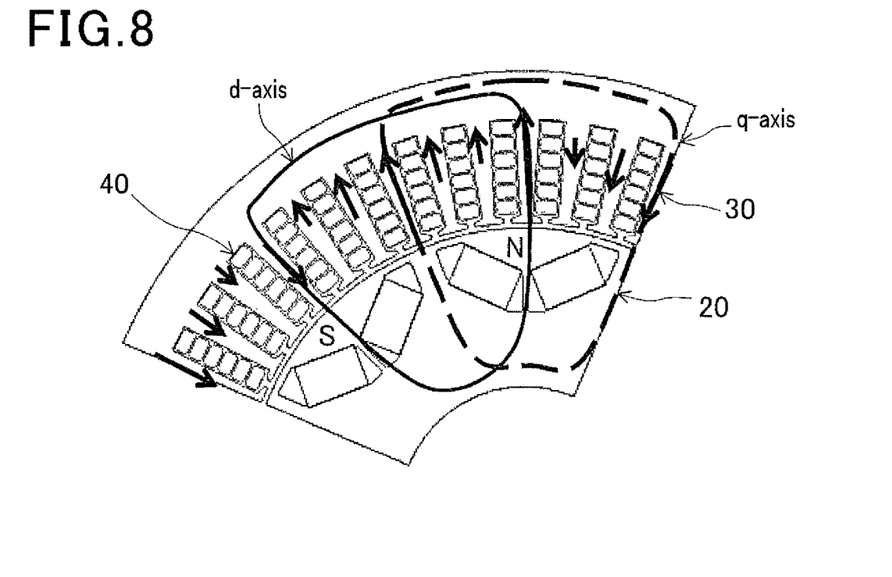
FIG. 8 is a schematic view illustrating both the flow of magnetic flux along a d-axis magnetic flux path and the flow of magnetic flux along a q-axis magnetic flux path in the rotating electric machine.

In FIG. 8, a d-axis magnetic flux path is shown with a continuous line, and a q-axis magnetic flux path is shown with a dashed line. Along the d-axis magnetic flux path, d-axis magnetic flux flows between the rotor 20 and the stator 30. Along the q-axis magnetic flux path, q-axis magnetic flux flows between the rotor 20 and the stator 30. Moreover, in FIG. 8, the continuous-line arrows indicate stator magnetic flux which is generated in the stator 30 when electric current having the first-order harmonic waveform is supplied to the stator coil 40. The longer the continuous-line arrows, the higher the strength of the stator magnetic flux.

Figure 9:
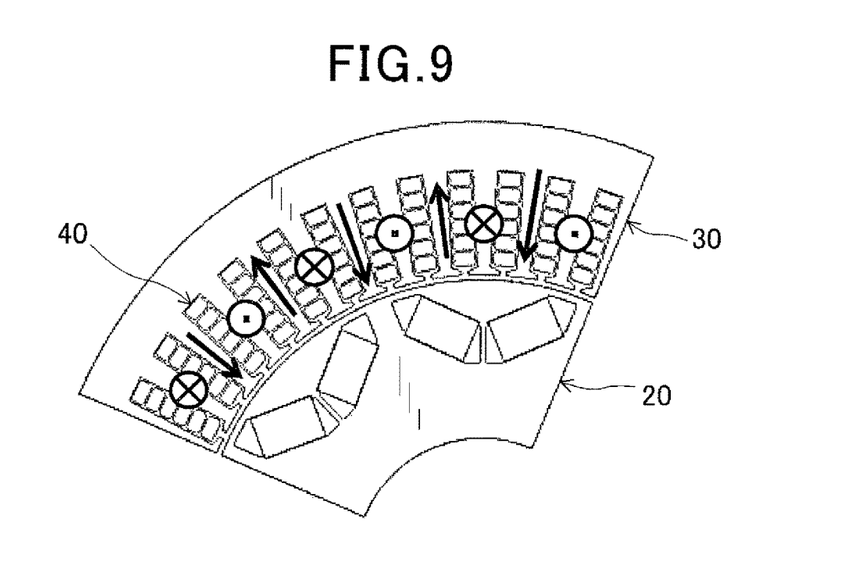
FIG. 9 is a schematic view illustrating magnetic flux in the stator when the electric current having a specific harmonic waveform is supplied to the stator coil.

On the other hand, in FIG. 9, the continuous-line arrows indicate stator magnetic flux which is generated in the stator 30 when electric current having the specific harmonic waveform is supplied to the stator coil 40. In the present embodiment, each phase winding of the stator coil 40 is arranged in a plurality of pairs of circumferentially adjacent slots 34 of the stator core 31. As seen from FIG. 9, for each of the pairs of circumferentially adjacent slots 34, the stator magnetic flux flows in opposite radial directions respectively on opposite circumferential sides of the pair of circumferentially adjacent slots 34.

Moreover, as seen from FIGS. 8 and 9, along the q-axis magnetic flux path, the stator magnetic flux generated by the electric current having the first-order harmonic waveform and the stator magnetic flux generated by the electric current having the specific harmonic waveform flow respectively in opposite radial directions and thus are canceled by each other. Consequently, the magnetic reluctance along the d-axis magnetic flux path is lowered, making it easier for magnetic flux to flow along the d-axis magnetic flux path. As a result, by supplying the stator coil 40 with the electric current having the waveform obtained by superimposing the specific harmonic waveform on the first-order harmonic waveform, it becomes possible to output an increased amount of the magnet magnetic flux Ψ.

According to the present embodiment, it is possible to achieve the following advantageous effects.

In the present embodiment, the rotating electric machine 1 includes the rotor 20 and the stator 30. The stator 30 includes the hollow cylindrical stator core 31 and the multi-phase stator coil 40. The stator core 31 is disposed in radial opposition to the rotor 20 and has the slots 34 arranged in the circumferential direction thereof. The stator coil 40 is mounted on the stator core 31 so as to be received in the slots 34 of the stator core 31. The stator coil 40 includes the three first windings 41 for high-speed output of the rotating electric machine 1, the three second windings 42 for low-speed output of the rotating electric machine 1, and the three switch units 45U, 45V and 45W. The first windings 41 are Δ-connected to define the three nodes 43U, 43V and 43W therebetween. The second windings 42 are arranged so as to be respectively connectable between the nodes 43U, 43V and 43W and the three phase terminals 44U, 44V and 44W of the stator coil 40. The switch units 45U, 45V and 45W respectively switch the connections between the nodes 43U, 43V and 43W and the phase terminals 44U, 44V and 44W between the direct connection state and the indirect connection state. In the direct connection state, the nodes 43U, 43V and 43W are respectively directly connected with the phase terminals 44U, 44V and 44W. In the indirect connection state, the nodes 43U, 43V and 43W are respectively connected with the phase terminals 44U, 44V and 44W via the second windings 42. The first and second windings 41 and 42 are mounted on the stator core 31 so that the first windings 41 are located closer than the second windings 42 to the rotor 20.

With the above configuration, the second windings 42 which produce more heat than the first windings 41 are located closer than the first windings 41 to the back core portion 32 of the stator core 31; the back core portion 32 has a high heat capacity. Consequently, heat produced by the stator coil 40 can be effectively dissipated and thus the stator coil 40 can be easily cooled. As a result, it is possible to improve the thermal characteristics of the stator coil 40. Moreover, since the first windings 41 which produce less heat are located closer to the rotor 20, it is possible suppress the influence of heat produced by the stator coil 40 on the permanent magnets 23 of the rotor 20, thereby suppressing demagnetization of the permanent magnets 23 due to heat.

In the present embodiment, the rotating electric machine 1 further includes the drive circuit 60 that supplies the Δ-connected first windings 41 with the electric current having the waveform that is obtained by superimposing the specific harmonic waveform on the first-order harmonic waveform. The specific harmonic waveform is one of the third-order and (3+6n)th-order harmonic waveforms or a harmonic waveform which is obtained by synthesizing at least two of the third-order and (3+6n)th-order harmonic waveforms, where n is a natural number greater than or equal to 1. The specific harmonic waveform takes a positive integral value for a positive half cycle of the first-order harmonic waveform and a negative integral value for a negative half cycle of the first-order harmonic waveform.

Figure 10:
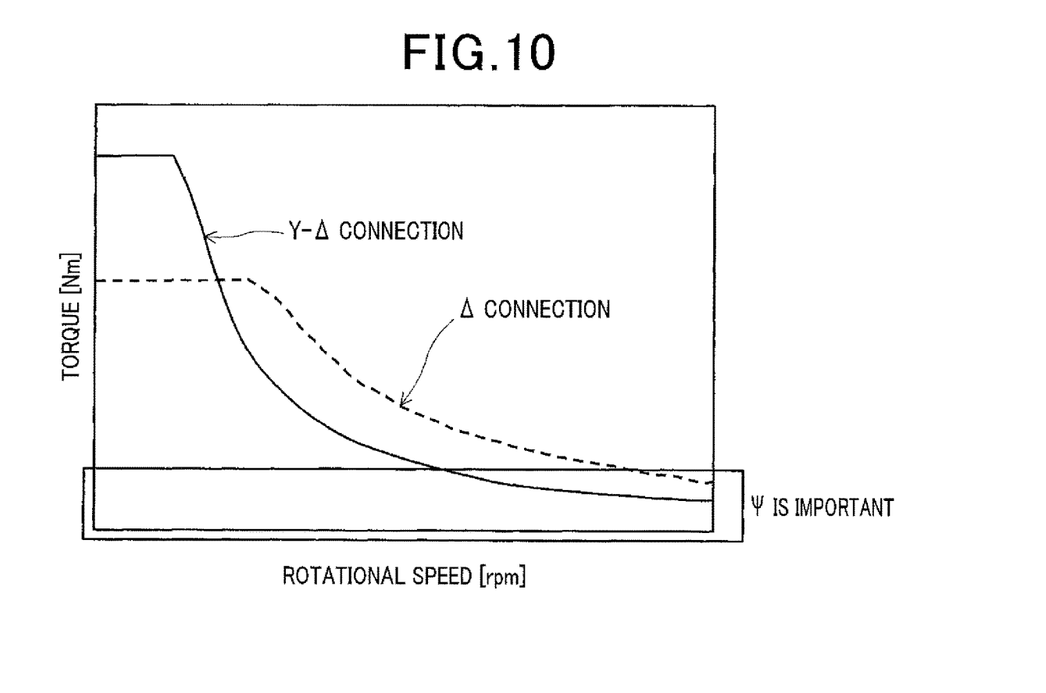
FIG. 10 is a graphical representation illustrating the relationship between the rotational speed and torque of the rotating electric machine both when the stator coil is Δ-connected and when the stator coil is Y-Δ-connected.

With the above configuration, the magnet magnetic flux $\Psi$ is increased by supplying the stator coil 40 with the electric current having the waveform obtained by superimposing the specific harmonic waveform on the first-order harmonic waveform. Moreover, by arranging the Δ-connected first windings 41 for high-speed output of the rotating electric machine 1 in the stator core 31 so as to be located on the rotor 20 side where the strength of the magnet magnetic flux $\Psi$ is high, it is possible to output a large amount of the magnet magnetic flux $\Psi$, thereby achieving a high efficiency of the rotating electric machine 1 in the low-torque region as shown in FIG. 10. Furthermore, by arranging the second windings 42 for low-speed output of the rotating electric machine 1 in the stator core 31 so as to be located on the non-rotor 20 side, it is possible to suppress increase in the magnet magnetic flux $\Psi$ while increasing the inductance. Consequently, during operation of the rotating electric machine 1 with the stator coil 40 being in the Y-Δ connection, it is possible to increase the maximum output torque of the rotating electric machine 1 in a low-speed region as shown in FIG. 10.

In the present embodiment, the first and second windings 41 and 42 of the stator coil 40 are formed of the electric wire segments 50. The electric wire segments 50 are axially inserted in the slots 34 of the stator core 31 to have the free end parts (or oblique parts) 55 thereof protruding from the corresponding axial end face of the stator core 31 (see FIG. 2). Each corresponding pair of distal ends of the free end parts 55 of the electric wire segments 50 are joined to each other.

With the above configuration, during the assembly of the stator coil 40 to the stator core 31, it is possible to easily distinguish those electric wire segments 50 which are arranged in the stator core 31 on the rotor 20 side for forming the first windings 41 from those electric wire segments 50 which are arranged in the stator core 31 on the non-rotor 20 side for forming the second windings 42. Consequently, it is possible to facilitate the process of joining corresponding pairs of distal ends of the free end parts 55 of the electric wire segments 50 to form the first and second windings 41 and 42. Moreover, it is easy to change the type and/or thickness of the electric wire segments 50, thus making it possible to select the suitable electric wire segments 50 according to the desired characteristics of the stator coil 40.

In the present embodiment, each of the electric wire segments 50 forming the first and second windings 41 and 42 of the stator coil 40 has a substantially rectangular cross section. In each of the slots 34 of the stator core 31, there are received an even number (more particularly, six in the present embodiment) of the electric wire segments 50 so as to be radially aligned with each other. Among the even number of the electric wire segments 50, two electric wire segments 50 which are located closest to the rotor 20 are included in the first windings 41.

With the above configuration, it is possible to more easily distinguish those electric wire segments 50 which are arranged in the slots 34 of the stator core 31 on the rotor 20 side for forming the first windings 41 from those electric wire segments 50 which are arranged in the slots 34 of the stator core 31 on the non-rotor 20 side for forming the second windings 42.

Second Embodiment

A rotating electric machine 1 according to a second embodiment has almost the same structure as the rotating electric machine 1 according to the first embodiment. Therefore, the differences therebetween will be mainly described hereinafter.

Figure 11:
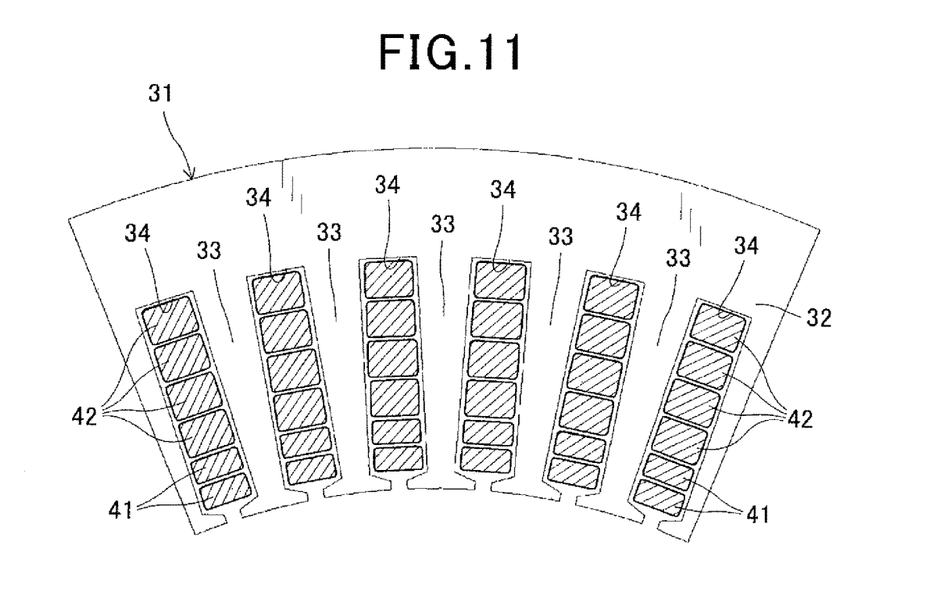
FIG. 11 is a schematic view, along an axial direction, of part of a stator of a rotating electric machine according to a second embodiment.

As shown in FIG. 11, in the present embodiment, as in the first embodiment, each of the electric wire segments 50 forming the first and second windings 41 and 42 of the stator coil 40 has a substantially rectangular cross section. In each of the slots 34 of the stator core 31, there are received six electric wire segments 50 forming the first and second windings 41 and 42 so as to be radially aligned with each other. Among the six electric wire segments 50, those two electric wire segments 50 which are located closest to the rotor 20 are included in the first windings 41, while the remaining four electric wire segments 50 are included in the second windings 42. In addition, as previously described in the first embodiment, the copper loss of the second windings 42 is about three times the copper loss of the first windings 41.

However, unlike in the first embodiment, in the present embodiment, as shown in FIG. 11, the cross-sectional area of each of the electric wire segments 50 forming the first windings 41 is set to be less than, more particularly be about ½ of the cross-sectional area of each of the electric wire segments 50 forming the second windings 42.

More specifically, in the present embodiment, the radial height of each of the electric wire segments 50 forming the first windings 41 is set to be about ½ of the radial height of each of the electric wire segments 50 forming the second windings 42, while the circumferential width of each of the electric wire segments 50 forming the first windings 41 is set to be equal to the circumferential width of each of the electric wire segments 50 forming the second windings 42. That is, the electric wire segments 50 forming the first windings 41 are flattened in comparison with the electric wire segments 50 forming the second windings 42.

According to the present embodiment, it is also possible to achieve the same advantageous effects as described in the first embodiment.

Moreover, in the present embodiment, since the cross-sectional area of each of the electric wire segments 50 forming the first windings 41 is set to be less than the cross-sectional area of each of the electric wire segments 50 forming the second windings 42, it is possible reduce the eddy current loss occurring in the first windings 41. Further, the rotor 20-side part (i.e., radially inner part) of the stator core 31 where the first windings 41 of the stator coil 40 are arranged is located close to the permanent magnets 23 of the rotor 20. Therefore, at the rotor 20-side part of the stator core 31, the strength of the magnet magnetic flux Ψ is high and thus the amount of leakage magnetic flux is large. Accordingly, by reducing the eddy current loss occurring in the first windings 41, it is possible to increase the efficiency of the rotating electric machine 1 in the low-torque region.

In addition, though not shown in the figures, each of the first windings 41 of the stator coil 40 may be comprised of a plurality of parallel windings each having a smaller cross-sectional area than the electric wire segments 50 forming the second windings 42 of the stator coil 40.

Third Embodiment

A rotating electric machine 1 according to a third embodiment has almost the same structure as the rotating electric machine 1 according to the first embodiment. Therefore, the differences therebetween will be mainly described hereinafter.

Figure 12:
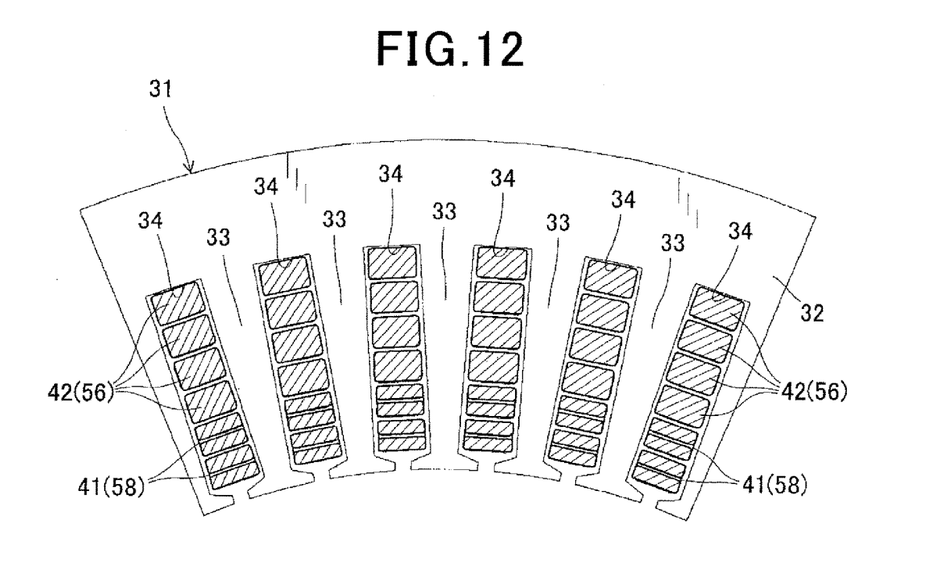
FIG. 12 is a schematic view, along an axial direction, of part of a stator of a rotating electric machine according to a third embodiment.
Figure 13:
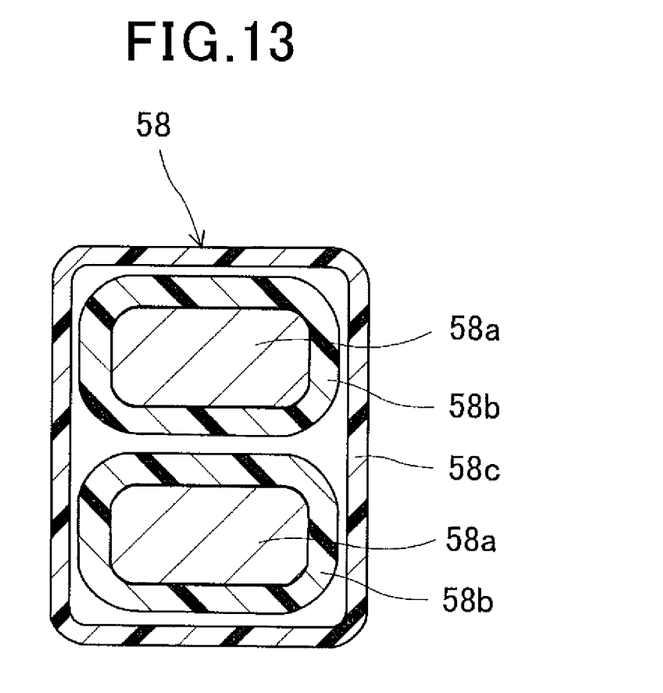
FIG. 13 is a schematic cross-sectional view illustrating the configuration of a laminated electric wire forming a first winding of a stator coil of the rotating electric machine according to the third embodiment.

As shown in FIGS. 12 and 13, in the present embodiment, each of the first windings 41 of the stator coil 40 is formed of a laminated electric wire 58. The laminated electric wire 58 includes a pair of rectangular electric wires that are laminated in a state of being electrically insulated from each other. Each of the rectangular electric wires includes a plate-shaped electric conductor 58a made of an electrically conductive material and an insulating coat 58b that covers the outer surface of the electric conductor 58a. The laminated electric wire 58 further includes a second insulating coat 58 that is formed to surround the pair of rectangular electric wires. Moreover, at both ends of the laminated electric wire 58 in the extending direction (or longitudinal direction) thereof, the electric conductors 58a of the rectangular electric wires are joined to each other. Furthermore, the cross-sectional area of each of the electric conductors 58a is set to be less than, more particularly be about ½ of the cross-sectional area of each of electric conductors 56 of electric wires forming the second windings 42 of the stator coil 40. That is, the sum of cross-sectional area of the electric conductors 58a of the pair of rectangular electric wires forming one laminated electric wire 58 is approximately equal to the cross-sectional area of the electric conductor 56 of one electric wire used for forming the second windings 42.

According to the present embodiment, it is also possible to achieve the same advantageous effects as described in the first embodiment.

Moreover, in the present embodiment, since the cross-sectional area of each of the electric conductors 58a is set to be less than the cross-sectional area of each of electric conductors 56, it is possible reduce the eddy current loss occurring in the first windings 41. Consequently, it is possible to increase the efficiency of the rotating electric machine 1 in the low-torque region.

Other Embodiments

While the above particular embodiments have been shown and described, it will be understood by those skilled in the art that the present invention can also be embodied in various other modes without departing from the spirit of the present invention.

For example, in the first embodiment, each of the switch units 45U, 45V and 45W includes a pair of switches that are on/off controlled by the controller. The pair of switches are configured so as to be operated in inverse relation to each other and thus not to be turned on at the same time (see FIG. 6).

Figure 14:
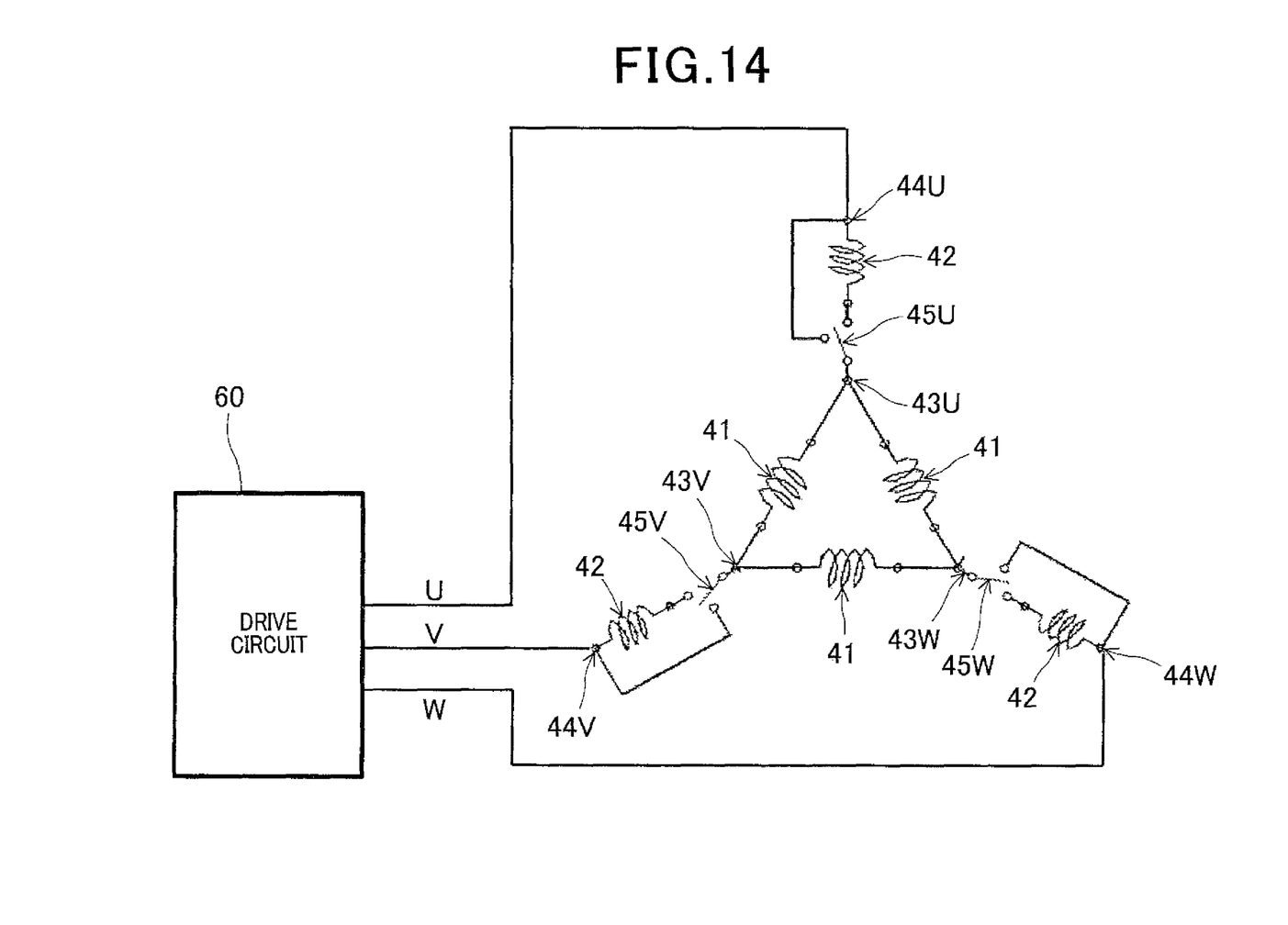
FIG. 14 is a schematic connection diagram of a stator coil according to a modification.

However, as shown in FIG. 14, each of the switch units 45U, 45V and 45W may alternatively include a relay that is cheaper than the pair of switches. The relays of the switch units 45U, 45V and 45W may be controller by the controller (not shown) to respectively switch the connections between the nodes 43U, 43V and 43W and the phase terminals 44U, 44V and 44W between the direct connection state and the indirect connection state as described in the first embodiment.

In the third embodiment, only the first windings 41 of the stator coil 40 are each formed of a laminated electric wire 58. However, the second windings 42 of the stator coil 40 may also be each formed of a laminated electric wire 58.

In the above-described embodiments, the present invention is directed to the rotating electric machine 1 that is configured as an electric motor for use in a motor vehicle. However, the present invention can also be applied to other rotating electric machines, such as an electric generator or a motor-generator that selectively functions either as an electric motor or as an electric generator.

What is claimed is:

1. A rotating electric machine comprising:
 a rotor; and
 a stator including a hollow cylindrical stator core and a multi-phase stator coil, the stator core being disposed in radial opposition to the rotor and having a plurality of slots arranged in a circumferential direction thereof, the stator coil being mounted on the stator core so as to be received in the slots of the stator core,
 wherein
 the stator coil includes three first windings, three second windings and three switch units,
 the first windings are Δ-connected to define three nodes therebetween,
 the second windings are arranged so as to be respectively connectable between the nodes and three phase terminals of the stator coil,
 the switch units respectively switch the connections between the nodes and the phase terminals between a direct connection state and an indirect connection state, thereby switching the stator coil between a Δ connection and a Y-Δ connection,
 in the direct connection state, the nodes are respectively directly connected with the phase terminals so that the stator coil forms the Δ connection,
 in the indirect connection state, the nodes are respectively connected with the phase terminals via the second windings so that the stator coil forms the Y-Δ connection, and
 the first and second windings are mounted on the stator core so that the entire first windings are located closer than the entire second windings to the rotor.

2. The rotating electric machine as set forth in claim 1, further comprising a drive circuit that supplies the Δ-connected first windings with electric current having a waveform that is obtained by superimposing a specific harmonic waveform on a first-order harmonic waveform, the specific harmonic waveform being one of third-order and (3+6n)th-order harmonic waveforms or a harmonic waveform which is obtained by synthesizing at least two of the third-order and (3+6n)th-order harmonic waveforms, where n is a natural number greater than or equal to 1, the specific harmonic waveform taking a positive integral value for a positive half cycle of the first-order harmonic waveform and a negative integral value for a negative half cycle of the first-order harmonic waveform.

3. The rotating electric machine as set forth in claim 1, wherein the first and second windings of the stator coil are formed of a plurality of electric wire segments,
   the electric wire segments are axially inserted in the slots of the stator core to have free end parts thereof protruding from an axial end face of the stator core, and
   each corresponding pair of distal ends of the free end parts of the electric wire segments are joined to each other.

4. The rotating electric machine as set forth in claim 3, wherein each of the electric wire segments forming the first and second windings of the stator coil has a substantially rectangular cross section,
   in each of the slots of the stator core, there are received an even number of the electric wire segments so as to be radially aligned with each other, and
   among the even number of the electric wire segments, an even number of those electric wire segments which are located closest to the rotor are included in the first windings.

5. The rotating electric machine as set forth in claim 1, wherein a cross-sectional area of each of the first windings is less than a cross-sectional area of each of the second windings.

6. The rotating electric machine as set forth in claim 1, wherein each of the first windings is formed of a laminated electric wire that includes a plurality of electric conductors laminated in a state of being electrically insulated from each other.

* * * * *